(12) United States Patent
Kimura (10) Patent No.: US 12,375,801 B2
(45) Date of Patent: Jul. 29, 2025

(54) CAMERA SYSTEM, MOVABLE APPARATUS, CAMERA SYSTEM CONTROL METHOD, AND STORAGE MEDIUM

(71) Applicant: CANON KABUSHIKI KAISHA, Tokyo (JP)

(72) Inventor: Takayuki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 296 days.

(21) Appl. No.: 18/157,205

(22) Filed: Jan. 20, 2023

(65) Prior Publication Data

US 2023/0247284 A1    Aug. 3, 2023

(30) Foreign Application Priority Data

Jan. 28, 2022   (JP) ................................ 2022-011697

(51) Int. Cl.
*H04N 23/66* (2023.01)
*H04N 23/60* (2023.01)
*H04N 23/667* (2023.01)

(52) U.S. Cl.
CPC ......... *H04N 23/665* (2023.01); *H04N 23/667* (2023.01)

(58) Field of Classification Search
CPC .......................... H04N 23/665; H04N 23/667
See application file for complete search history.

(56) References Cited

U.S. PATENT DOCUMENTS 10,763,285 B2    9/2020   Shibata et al.
11,790,634 B2 *  10/2023  Murao ................. G06V 10/507
                                              382/104

(Continued)

FOREIGN PATENT DOCUMENTS

EP    2 299 695 A1    3/2011
JP    2010028363 A    2/2010

(Continued)

OTHER PUBLICATIONS

Partial European Search Report issued on Jun. 22, 2023, in corresponding European Patent Application No. 22217269.4 (17 pages).

(Continued)

*Primary Examiner* — Lin Ye
*Assistant Examiner* — Fayez A Bhuiyan
(74) *Attorney, Agent, or Firm* — Venable LLP (57) ABSTRACT

A camera system includes a processor/circuit functioning as an imaging system including a unit imaging an object to generate an image signal. A gradation compression unit performs gradation compression processing on the image signal based on input/output conversion parameters. An imaging system control unit sets the conversion parameter in the gradation compression unit, and an image processing system acquires an image from the imaging system in various imaging modes. The imaging system control unit sets the conversion parameter in the gradation compression unit according to the imaging mode. The conversion parameters include at least a parameter for viewing suitable for visually recognizing an image and one for sensing suitable for image recognition. The imaging modes include an automatic driving mode and a manual driving mode. The imaging system control unit sets the sensing parameter in the automatic driving mode and sets the parameter for viewing in the manual driving mode.

16 Claims, 8 Drawing Sheets

(56) References Cited

U.S. PATENT DOCUMENTS

| | | |
|---|---|---|
| 2011/0242366 A1 | 10/2011 | Yamashita et al. |
| 2014/0085473 A1 | 3/2014 | Donishi et al. |
| 2016/0105679 A1 | 4/2016 | Murao et al. |
| 2019/0394377 A1 | 12/2019 | Zama et al. |
| 2020/0029052 A1 | 1/2020 | Murao et al. |
| 2020/0349684 A1 | 11/2020 | Jung et al. |
| 2021/0150994 A1 | 5/2021 | Fukai et al. |

FOREIGN PATENT DOCUMENTS

| | | |
|---|---|---|
| JP | 2012100022 A | 5/2012 |
| JP | 2013150153 A | 8/2013 |
| JP | 2014-146135 A | 8/2014 |
| JP | 2018-056838 A | 4/2018 |
| JP | 2018078372 A | 5/2018 |
| JP | 2022018427 A | 1/2022 |
| WO | 2006098360 A | 9/2006 |

OTHER PUBLICATIONS

Extended European Search Report issued on Oct. 31, 2023, in corresponding European Patent Application No. 22217269.4 (20 pages).

Japanese Office Action issued Mar. 4, 2024, in corresponding Japanese Patent Application No. 2022-011697, with English translation (12 pages).

* cited by examiner

CAMERA SYSTEM, MOVABLE APPARATUS, CAMERA SYSTEM CONTROL METHOD, AND STORAGE MEDIUM

CROSS-REFERENCE TO PRIORITY APPLICATION

This application claims the benefit of Japanese Patent Application No. 2022-011697 filed on Jan. 28, 2022, which is hereby incorporated by reference herein in its entirety.

BACKGROUND OF THE INVENTION

Field of the Invention

The present invention relates to a camera system, a movable apparatus, a camera system control method, a storage medium, and the like.

Description of the Related Art

Many recent in-vehicle camera systems perform dynamic range expansion (HDR: Height Dynamic Range) by synthesizing a plurality of images acquired under different exposure conditions. As a representative example of dynamic range expansion, there is a technique for synthesizing a plurality of images acquired with different exposure periods to generate one dynamic range expanded image.

Specifically, pixels on a low-luminance side of an image acquired with a long exposure period and pixels on a high-luminance side of an image acquired with a short exposure period are synthesized to generate one synthesized image. By performing such processing, it is possible to acquire an image with a high dynamic range for maintaining the gradation of dark parts and expressing bright objects without overexposure.

However, when a plurality of images are synthesized using such a dynamic range expansion technique, a bit depth of a luminance value increases, resulting in an enormous transmission rate. Since a transmission band of a camera output is limited, it is essential to reduce the amount of data of a synthesized image generated using a dynamic range expansion technique in order to output the synthesized image. In addition, such an increase in the amount of data poses a problem not only due to the expansion of a dynamic range, but also due to an increase in the resolution of a camera.

Japanese Patent Application Laid-Open No. 2018-56838 proposes a technique for compressing image data by setting a partial region within an imaging region based on a traveling state of a vehicle and lowering the resolution of the outside of the partial region.

Further, Japanese Patent Application Laid-Open No. 2014-146135 proposes a technique for generating a plurality of reduced images by compressing an original image captured by a camera in a stepwise manner and detecting moving objects in order from a reduced image with the high compression level to detect a moving object at an early stage and also reduce the load of detection processing.

The amount of data of an output image can be reduced by reducing the resolution using the techniques disclosed in Japanese Patent Application Laid-Open No. 2018-56838 and Japanese Patent Application Laid-Open No. 2014-146135, but image quality performance for viewing, object recognition performance for sensing, and the like, deteriorate due to the reduction in resolution. Thus, there is a possibility that the original purpose (visual recognition of images, object recognition, and the like) will be adversely affected in terms of performance.

On the other hand, it is possible to compress the gradation, for example, by allocating more gradation to low luminance pixels and less gradation to high luminance pixels in accordance with characteristics of human vision. However, for example, when more gradations are allocated to low luminance pixels in the same manner as input/output conversion parameters at the time of viewing in a case when an automated driving car performs sensing using an in-vehicle camera, gradations to be allocated to medium luminance to high luminance regions are reduced.

For this reason, sensing performance for objects in medium to high luminance regions may be degraded. In particular, when objects in medium to high luminance regions, such as traffic lights or road traffic signs, are erroneously recognized during travel according to automated driving, there is a concern that an automated driving car may erroneously estimate its own position, or an accident may occur.

Consequently, one of the objects of the present invention is to provide a camera system capable of performing optimum gradation compression processing in accordance with an imaging mode.

SUMMARY OF THE INVENTION

In order to achieve the above-described object, a camera system according to one aspect of the present invention is constituted by an imaging system including at least one processor or circuit configured to function as an imaging system that includes an imaging unit configured to image an object to generate an image signal, a gradation compression unit configured to perform gradation compression processing on the image signal based on at least one of two or more input/output conversion parameters, and an imaging system control unit that sets the input/output conversion parameter in the gradation compression unit, and an image processing system that acquires an image from the imaging system in at least one of two or more imaging modes, in which the imaging system control unit sets the input/output conversion parameter in the gradation compression unit according to the imaging modes in the image processing system.

Further features of the present invention will become apparent from the following description of embodiments with reference to the attached drawings.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

First Embodiment

Figure 1:
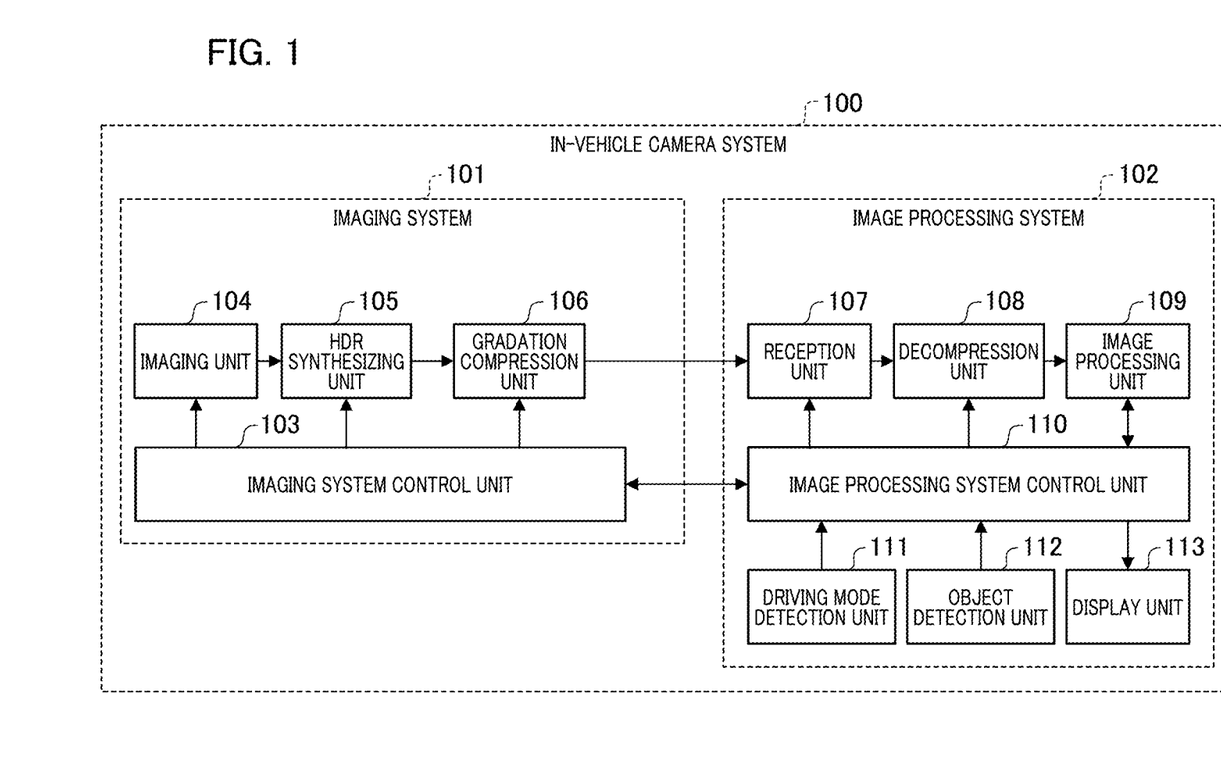
FIG. 1 is a functional block diagram of an in-vehicle camera system 100 according to a first embodiment.

FIG. 1 is a functional block diagram of an in-vehicle camera system 100 in a first embodiment. The in-vehicle camera system 100 is constituted by two systems, including an imaging system 101 and an image processing system 102.

In the present embodiment, the in-vehicle camera system 100 is assumed to be mounted in or mounted on a movable apparatus such as an automobile, but the movable apparatus is not limited to an automobile.

Note that some of the functional blocks illustrated in FIG. 1 are implemented by causing a computer, not illustrated in the drawing, which is included in the in-vehicle camera system 100 to execute a computer program stored in a memory, not illustrated in the drawing, as a storage medium.

However, some or all may be implemented by hardware. As the hardware, a dedicated circuit (ASIC), a processor (reconfigurable processor, DSP), or the like, can be used.

Note that functional blocks in the imaging system 101 do not need to be built in the same housing, and may be configured as separate devices connected to each other via signal paths. Similarly, functional blocks in the image processing system 102 may not be built in the same housing, and may be constituted by separate devices connected to each other via signal paths.

First, the imaging system 101 will be described. The imaging system 101 is constituted by an imaging system control unit 103, an imaging unit 104, an HDR synthesizing unit 105, a gradation compression unit 106, and the like.

The imaging system control unit 103 controls the overall imaging system 101. The imaging system control unit 103 also mainly controls the imaging unit 104, the HDR synthesizing unit 105, and the gradation compression unit 106, and exchanges information with the image processing system 102. The imaging system control unit 103 has a built-in CPU as a computer and functions as a control unit that controls the operation of each part of the imaging system based on the computer program stored in the memory as a storage medium. Details will be described later.

The imaging unit 104 includes an optical system, which is not illustrated in the drawing, and includes an imaging element, such as a CMOS image sensor, which captures an optical image of an object formed by the optical system. The imaging element includes a plurality of pixels, and each of the pixels includes a photoelectric conversion element (photodiode) that photoelectrically converts incident light. The imaging unit 104 has an AD conversion function of converting an analog electrical signal output from the photoelectric conversion element into a digital signal.

Further, the imaging unit 104 has a function of imaging an object, generating an image signal, and controlling an exposure period in response to an exposure control signal input from the imaging system control unit 103. Note that the imaging unit 104 may be configured such that a gain of the imaging element can be switched.

Further, in the present embodiment, the imaging unit 104 is disposed, for example, on the front, rear, right, and left sides of a movable apparatus such as an automobile, and is constituted by a plurality of cameras for imaging objects around the automobile.

Figure 2:
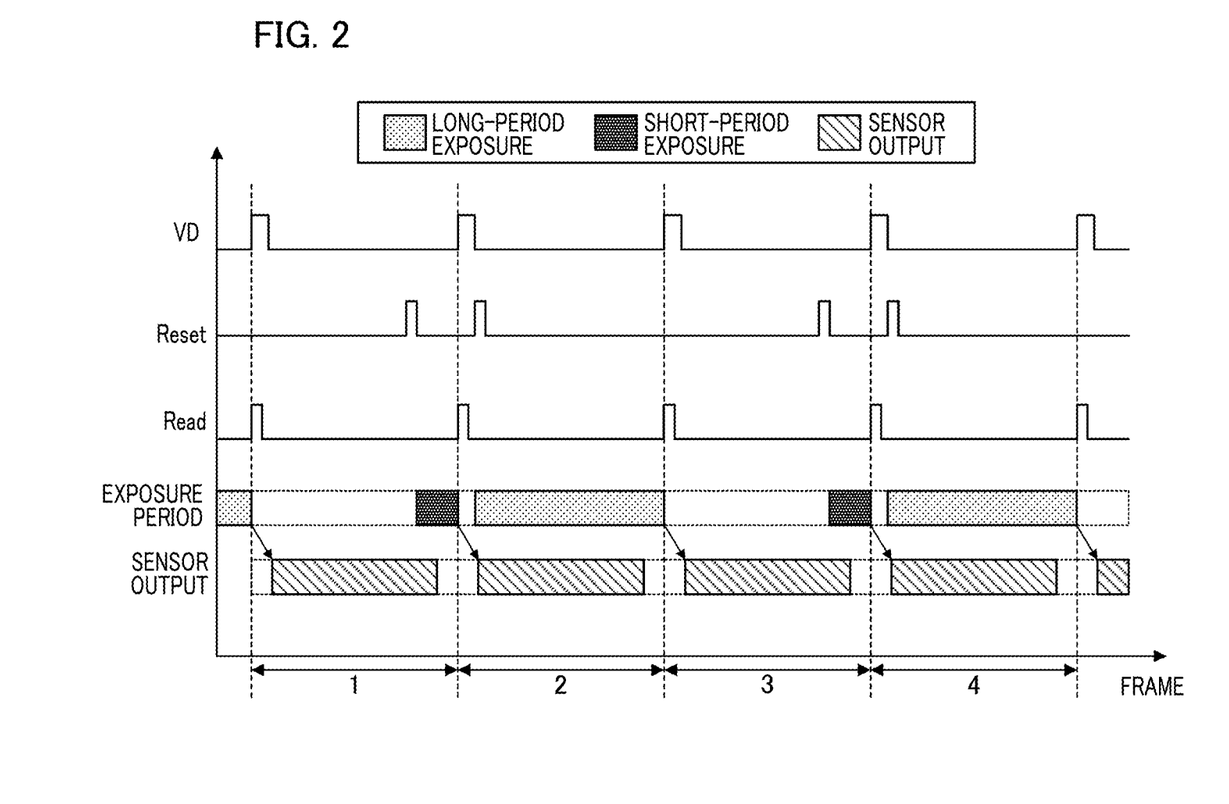
FIG. 2 is a conceptual diagram illustrating an exposure control method according to the first embodiment.

FIG. 2 is a conceptual diagram illustrating an exposure control method in the first embodiment, and the exposure control method in the present embodiment will be described with reference to FIG. 2.

In FIG. 2, VD is a signal indicating a start timing of each frame. A control signal of VD is transmitted from the imaging system control unit 103 to the imaging unit 104, and control such as resetting and reading for acquiring an image for one frame when the VD signal rises, and the like, are started.

A Reset signal is a control signal for connecting the photoelectric conversion element to a reset power supply and setting the potential of the photoelectric conversion element to a reset (reference) potential, and reset control is executed while the Reset signal is in a High period.

A Read signal is a control signal for reading out a charge generated in the photoelectric conversion element, and charge readout control is started at a timing when the Read signal rises.

An exposure period is a period from a Reset falling timing to a Read rising timing, and indicates a period in which charge is accumulated in a state when the photoelectric conversion element is irradiated with light. The amount of charge generated in the photoelectric conversion element changes depending on the length of the exposure period.

That is, the level of an output luminance for incident light changes depending on the length of the exposure period. In the present embodiment, imaging is performed for a first frame in a short exposure period, and imaging is performed for a subsequent second frame in a long exposure period.

From a third frame and the subsequent frames, exposure control is performed by alternately repeating short-period exposure and long-period exposure for each frame. Although two types of exposure conditions, that is, short-period exposure and long-period exposure, will be described in the present embodiment, three or more types of exposure conditions may be combined. By increasing the number of exposure conditions, a function of dynamic range decompression processing can be improved.

A period shown in a sensor output in a graph of FIG. 2 indicates a period during which the imaging unit 104 converts an electrical signal read from the photoelectric conversion element into a digital luminance signal in accordance with Read control and outputs the digital luminance signal to the HDR synthesizing unit 105.

Figure 3A:
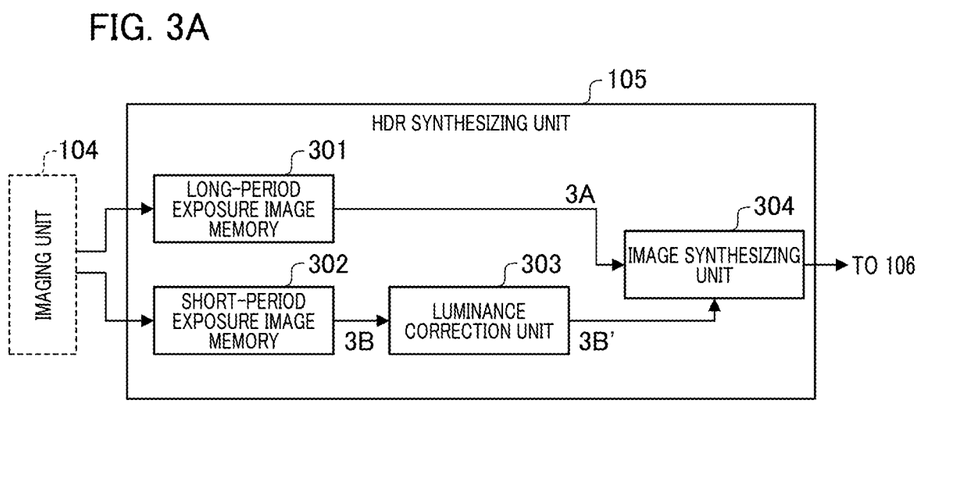
FIG. 3A is a functional block diagram illustrating an outline of a configuration of an HDR synthesizing unit 105 according to the first embodiment
Figure 3B:
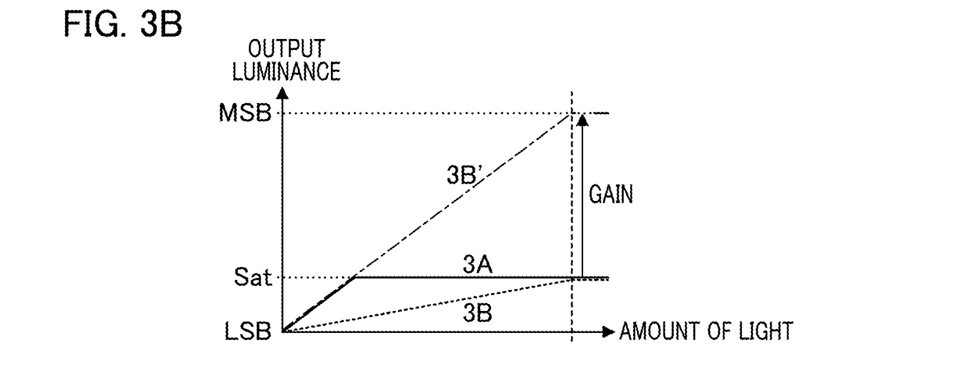
FIG. 3B is a diagram illustrating processing in a luminance correction unit 303.
Figure 3C:
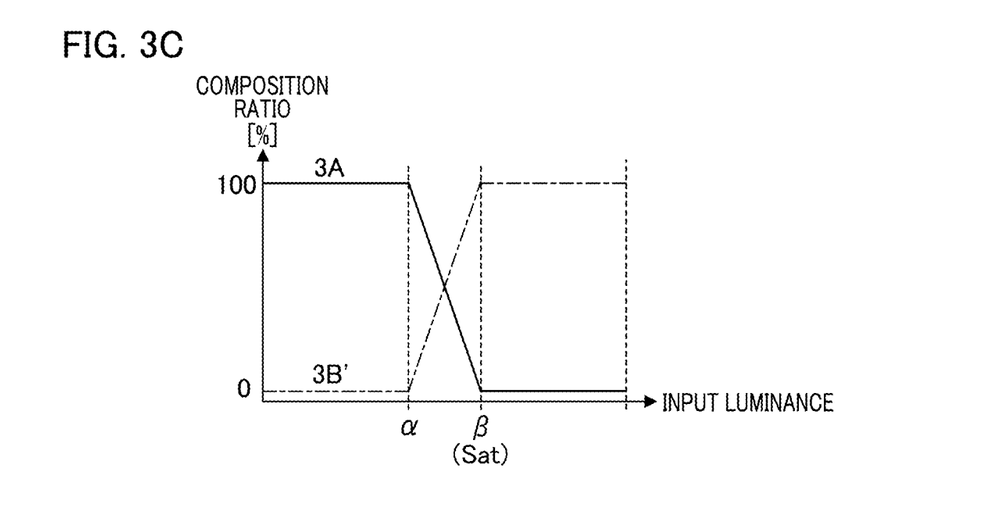
FIG. 3C is a diagram illustrating a method of generating a synthesized image by an image synthesizing unit 304 in the first embodiment.

The HDR synthesizing unit 105 is a unit for performing HDR synthesizing processing using two image signals acquired from the imaging unit 104 under two different exposure conditions. An HDR synthesizing method in the present embodiment will be described with reference to FIG. 3.

FIG. 3A is a functional block diagram illustrating an outline of the configuration of the HDR synthesizing unit 105 according to the first embodiment. The HDR synthesizing unit 105 includes a long-period exposure image memory 301, a short-period exposure image memory 302, a luminance correction unit 303, an image synthesizing unit 304, and the like.

Among image signals output from the imaging unit 104, an image obtained by long-period exposure is stored in the long-period exposure image memory 301. In addition, an image acquired by short-period exposure is stored in the short-period exposure image memory 302. The luminance correction unit 303 performs correction for making the luminance level of the image acquired by the short-period exposure conform to the luminance level of the image acquired by the long-period exposure.

By such correction, it is possible to join and to synthesize the image acquired by the long-period exposure and the image acquired by the short-period exposure without a sense of incongruity.

FIG. 3B is a diagram illustrating processing in the luminance correction unit 303. In FIG. 3B, the horizontal axis represents the amount of light of an object, and the vertical axis represents an output luminance of the imaging unit 104.

In the drawing, FIG. 3A is a graph showing an output luminance with respect to the amount of light of an object during long-period exposure, FIG. 3B is a graph showing an output luminance with respect to the amount of light of an object during short-period exposure, and FIG. 3B' is a graph of the output luminance of FIG. 3B after luminance correction processing is performed by the luminance correction unit 303. In addition, Sat on the vertical axis indicates a saturation level of the photoelectric conversion element.

In FIG. 3A, an exposure period is long, and thus the output luminance reaches the Sat level as soon as the amount of light of the subject increases. In FIG. 3B, an exposure period is short, and thus the output luminance reaches the Sat level after the amount of light of the subject becomes larger than that in FIG. 3A. The luminance correction unit 303 combines the luminance outputs of FIG. 3A and FIG. 3B by multiplying the luminance output of 3B by a predetermined gain.

Specifically, a gain is obtained by dividing the exposure period of the long-period exposure by the exposure period of the short-period exposure, and the gain is multiplied by the luminance output of the short-period exposure image, thereby setting the luminance output of the image acquired by the long-period exposure and the luminance output of the image acquired by the short-period exposure to be equal luminance values.

The image synthesizing unit 304 synthesizes the luminance output of FIG. 3A and the luminance output of 3B' to generate one dynamic range expanded image, in which the long-period exposure image and the short-period exposure image are synthesized.

FIG. 3C is a diagram illustrating a method of generating a synthesized image by the image synthesizing unit 304 in the first embodiment. In FIG. 3C, the horizontal axis represents an input luminance, and the vertical axis represents a composition ratio between a long-period exposure image and a short-period exposure image.

In addition, luminance of α to β on the horizontal axis is a luminance near switching between the long-period exposure image and the short-period exposure image, and it is ideally preferable to set the luminance of β to a luminance near Sat in FIG. 3B.

When an input luminance value is equal to or less than α, 100% of a luminance value 3A of the long-period exposure image is used. In a luminance value range of α to β, each of the luminance value 3A of the long-period exposure image and the luminance value 3B' of the short-period exposure image is multiplied by the composition ratio shown in the graph of FIGS. 3B and 3C, and the results are added up.

When the luminance value is β or more, 100% of the luminance value 3B' of the short-period exposure image is used. By performing such processing, the image acquired by the long-period exposure and the image acquired by the short-period exposure can be synthesized to generate one synthesized image with an expanded dynamic range.

The dynamic range expanded image generated by the HDR synthesizing unit 105 is output to the gradation compression unit 106.

The gradation compression unit 106 performs gradation compression processing on the dynamic range expanded image output by the HDR synthesizing unit 105 based on input/output conversion parameters for compressing gradation.

Note that, in FIGS. 2 and 3A to 3C, a dynamic range expanded image is generated by outputting an image signal obtained by synthesizing images obtained by imaging an object with different exposure periods. However, a dynamic range expanded image may be generated by outputting an image signal obtained by synthesizing images obtained by imaging an object with different sensitivities (gains).

A gradation compression processing method in the present embodiment will be described with reference to FIGS. 4A to 4C.

Figure 4A:
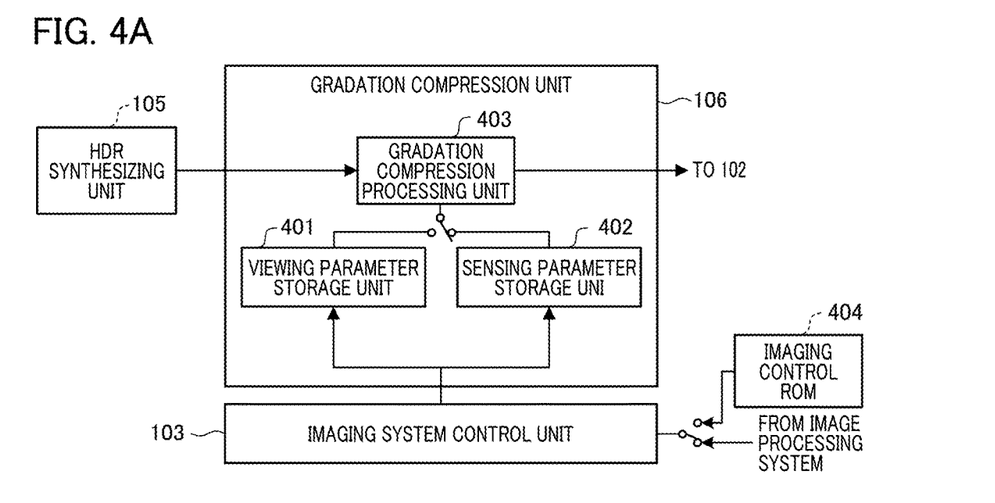
FIG. 4A is a functional block diagram illustrating an outline of a configuration of a gradation compression unit 106 according to the first embodiment.

FIG. 4A is a functional block diagram illustrating an outline of a configuration of the gradation compression unit 106 of first embodiment. The gradation compression unit 106 includes a viewing parameter storage unit 401, a sensing parameter storage unit 402, a gradation compression processing unit 403, and the like.

The viewing parameter storage unit 401 stores input/output conversion parameters suitable for visually recognizing an image used by the gradation compression unit 106 at the time of performing viewing.

Figure 4B:
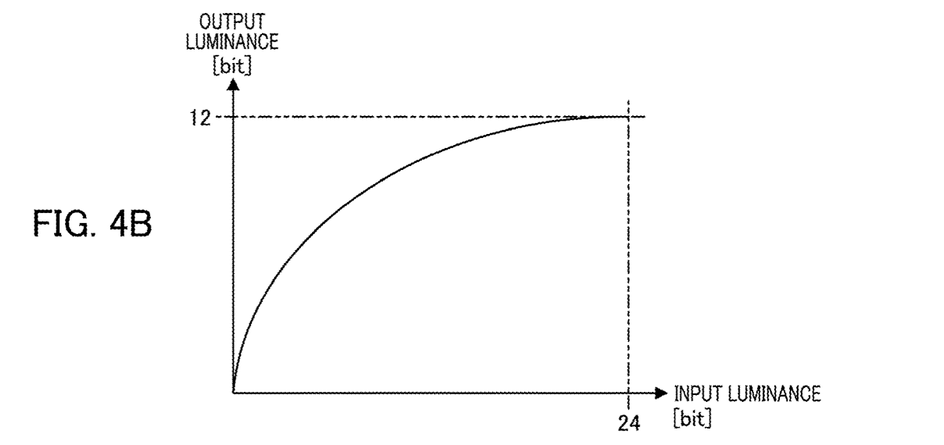
FIG. 4B is a diagram illustrating parameter characteristics of an input/output conversion parameter stored in a viewing parameter storage unit 401.

FIG. 4B is a diagram illustrating an example of parameter characteristics of an input/output conversion parameter stored in the viewing parameter storage unit 401. In FIG. 4B, the horizontal axis represents an input luminance, and the vertical axis represents an output luminance. In the present embodiment, a graph in which a 24-bit input luminance is converted into a 12-bit output luminance is described, but the number of bits is not limited to this example.

In the parameter characteristics illustrated in FIG. 4B, more gradations than parameters for sensing are allocated to luminance values equal to or less than a predetermined luminance value, based on a visual characteristic that the human eye is more sensitive to dark parts. than to bright parts. That is, the parameters for viewing are set such that an inclination of an output luminance for luminance values equal to or less than a predetermined luminance value is larger than that, for example, of the parameters for sensing illustrated in FIG. 4C.

On the other hand, an inclination of an output luminance for an intermediate luminance, which is greater than the predetermined luminance value, is set to be smaller than that in the parameters for sensing. By using such parameter characteristics, it is possible to improve the expressive power of gradation in dark parts and to display image quality suitable for viewing.

The sensing parameter storage unit 402 stores input/output conversion parameters suitable for image recognition used by the gradation compression unit 106 at the time of performing sensing.

Figure 4C:
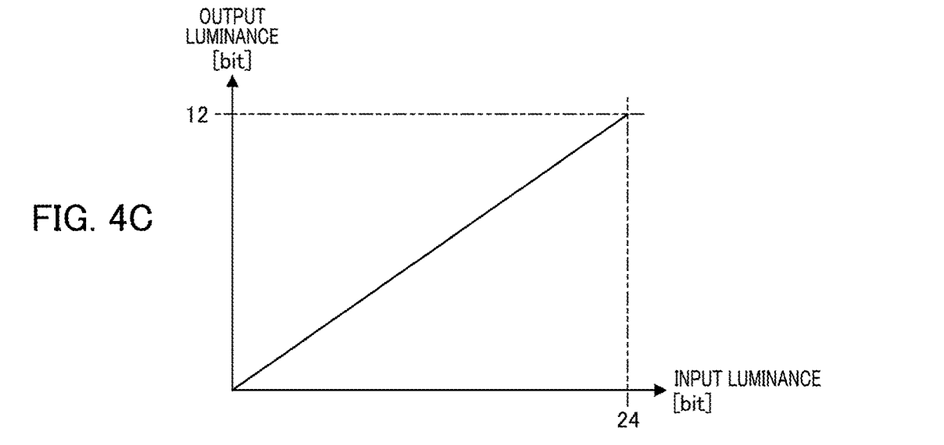
FIG. 4C is a diagram illustrating an example of parameter characteristics of an input/output conversion parameter stored in a sensing parameter storage unit 402.

FIG. 4C is a diagram illustrating an example of parameter characteristics of the input/output conversion parameter stored in the sensing parameter storage unit 402. In FIG. 4C, the horizontal axis represents an input luminance, and the vertical axis represents an output luminance. Note that FIG. 4C illustrates a graph in which a 24-bit input luminance is converted into a 12-bit output luminance, but the number of bits is not limited to this example.

As illustrated in the graph of FIG. 4C, when object recognition is performed, a feature amount is often detected mechanically using a luminance difference of an object without depending on a luminance value, and thus gradations are substantially equally allocated to all luminances in the present embodiment.

That is, the parameters for sensing are set such that an inclination of an output luminance for input luminance values equal to or less than a predetermined input luminance value is less than that in the parameters for viewing, and less gradations are allocated to luminance values equal to or less the predetermined luminance value than the parameters for viewing.

On the other hand, an inclination of an output luminance with respect to an intermediate luminance greater than the predetermined value is set to be greater than that in the parameters for viewing. This is because gradation of intermediate luminance is sufficiently necessary for image recognition. In the present embodiment, gradations are allocated substantially equally, which is a linear characteristic (curve), but characteristics of an input/output conversion parameter may be changed as appropriate depending on an object recognition method, characteristics, algorithm specifications, and the like.

Here, a method of setting input/output conversion parameters in the two parameter storage units will be described. In the present embodiment, when the imaging system 101 is started up, the imaging system control unit 103 acquires both an input/output conversion parameter for viewing and an input/output conversion parameter for sensing from the image processing system 102.

Among the acquired input/output conversion parameters, the input/output conversion parameter for viewing as illustrated in FIG. 4B is stored in the viewing parameter storage unit 401. In addition, the input/output conversion parameter for sensing, as illustrated in FIG. 4C, is stored in the sensing parameter storage unit 402.

Note that, although both the input/output conversion parameter for viewing and the input/output conversion parameter for sensing are acquired at the time of startup in the present embodiment, any of other timings may be used, and an appropriate timing may be set in accordance with system control specifications.

Further, in the present embodiment, a description is given on the assumption that information of input/output conversion parameters is acquired from the image processing system 102, but as illustrated in FIG. 4A, an imaging control ROM 404 may be provided separately in the imaging system 101 to automatically read out the information. In this manner, it is possible to complete the setting of input/output conversion parameters only in the imaging system 101 without communicating information with other systems.

Note that, it may be able to select whether to acquire the information of the input/output conversion parameters from the image processing system 102 or from the imaging control ROM 404 by using a switch as illustrated in FIG. 4A.

In addition, the image processing system 102 may be able to acquire the input/output conversion parameters from an external server or the like, for example, via a network. Thereby, it is possible to easily upgrade the input/output conversion parameters.

Further, in the present embodiment, two parameter storage units are provided for viewing and sensing, but only one or three or more storage units may be provided. In a case when only one storage unit is provided, the circuit size of the gradation compression unit 106 is reduced. However, when the setting of gradation compression processing is switched, it is necessary to acquire input/output conversion parameters from the imaging system control unit 103 each time and to reset the input/output conversion parameters, and thus it takes time to perform switching.

In a case when three or more storage units are provided, setting is switched rapidly, but the circuit size of the gradation compression unit 106 is increased. The number of parameter storage units may be determined in accordance with a permissible system size, a required switching speed, and the like.

The gradation compression processing unit 403, in the present embodiment, is configured to perform gradation compression processing based on two or more input/output conversion parameters, and the input/output conversion parameters are selected based on information received from the imaging system control unit 103.

That is, the gradation compression processing unit 403 selects either the input/output conversion parameter for viewing set in the viewing parameter storage unit 401 and the input/output conversion parameter for sensing set in the sensing parameter storage unit 402.

Gradation compression processing is performed by outputting an output luminance value corresponding to a luminance value of a synthesized image output from the HDR synthesizing unit 105 based on the selected input/output conversion parameters. After the gradation compression processing is performed by the gradation compression unit 106, the result is output to the image processing system 102.

The image processing system 102 includes a reception unit 107, a decompression unit 108, an image processing unit 109, an image processing system control unit 110, a driving mode detection unit 111, an object detection unit 112, a display unit 113, and the like.

The image processing system 102 in the present embodiment has two driving modes corresponding to imaging modes and acquires images from the imaging system 101 in different imaging modes in at least one of the two driving modes. That is, the image processing system 102 has image processing steps of acquiring images from the imaging system in at least one of two or more imaging modes.

In the present embodiment, a first driving mode is a manual driving mode in which a driver mainly drives manually while looking at an electronic mirror, and a second driving mode is an automatic driving mode in which the image processing system 102 automatically drives while recognizing an image of an object around the vehicle.

In the case of the manual driving mode, system control for viewing is performed, and, in the automatic driving mode, system control for sensing is performed. Note that the automatic driving mode is not limited to fully automatic driving (steering, braking, starting movement and stopping movement, and the like) of a vehicle as a movable apparatus, and includes automatically braking or warning by using object recognition, or the like, to support manual driving.

The reception unit 107 receives an image signal output from the gradation compression unit 106. The received image signal is output to the decompression unit 108 and subjected to decompression processing. Specifically, a luminance value compressed by the gradation compression unit 106 is decompressed, for example, such that the luminance value becomes substantially the same as before the gradation compression processing.

The decompression unit 108 has two types of decompression parameters for viewing and sensing, similar to the gradation compression unit 106, and sets appropriate decompression parameters in accordance with a driving mode.

The decompression parameters for viewing and sensing have characteristics obtained by reversing the vertical and horizontal axes of the compression characteristics for viewing and sensing illustrated in FIGS. 4B and 4C, respectively. Note that, in the present embodiment, the compression characteristic for sensing is linear as illustrated in FIG. 4C, and thus the decompression parameter for sensing is also linear. After the decompression processing is performed by the decompression unit 108, the result is output to the image processing unit 109.

The image processing unit 109 performs development processing, white balance processing, and other necessary image processing in accordance with a driving mode, and the like. For example, in a case when a driving mode is a manual driving mode, image processing is performed such that image quality suitable for a driver's viewing is obtained.

After various type of image processing are performed, processing for displaying an image on the display unit 113 for the driver to visually recognize the image is also performed to generate an image for viewing. Note that the image for viewing which is output from the image processing unit 109 may be displayed on the display unit 113 even in an automatic driving mode.

On the other hand, in a case when the driving mode is an automatic driving mode, the image processing system 102 performs image processing suitable for sensing. That is, before the object detection unit 112 detects an object, image emphasis processing such as contour emphasis processing and color emphasis processing is performed in advance.

Note that an image having been subjected to the image emphasis processing suitable for sensing is not optimum for humans to observe images, and thus the image for viewing output from the image processing unit 109, may be displayed on the display unit 113 as described above.

In this case, the image processing unit 109 performs the image emphasis processing suitable for sensing and processing for the image for viewing at the same time, which increases a load. Thus, as the image processing unit, two image processing units, that is, an image processing unit for sensing that performs image emphasis processing suitable for sensing and an image processing unit for viewing that performs processing for an image for viewing may be provided separately.

The image processing system control unit 110 controls the overall image processing system 102 such as the detection of a driving mode, driving control, the control of the reception unit 107, the decompression unit 108, and the image processing unit 109, which are described above, and the transmission of information regarding a driving mode to the imaging system 101.

The image processing system control unit 110 has a built-in CPU as a computer, and functions as a control unit that controls the operation of each part of the image processing system 102 based on a computer program stored in a memory as a storage medium.

The driving mode detection unit 111 is a unit for detecting a driving mode, and acquires driving mode information from a movable apparatus drive control device provided in a movable apparatus. Note that the movable apparatus drive control device is a device that includes a built-in computer for performing drive control of a motor or an engine as a drive source for moving the movable apparatus, and has a plurality of driving modes.

Specifically, the driving mode detection unit 111 detects which state of a manual driving mode or an automatic driving mode in which the current driving mode is set to be. Based on the detection result, the image processing system control unit 110 determines whether to perform control for viewing or control for sensing.

In addition, the image processing system control unit 110 transmits information indicating which state of sensing or viewing is set to the imaging system control unit 103. The imaging system control unit 103 having received the information sets input/output conversion parameters of the gradation compression unit 106 to be appropriate parameters out of the parameters in FIG. 4B and the parameters in FIG. 4C.

The object detection unit 112 performs object detection in a case when a driving mode is an automatic driving mode. Specifically, an image output from the image processing unit 109 is subjected to object detection processing in which image recognition has been performed from information such as the color, contour, and feature amount of an object. As the object detection processing in which the image recognition has been performed, a technique such as template matching may be used.

The image processing system control unit 110 transmits an object detection result to a movable apparatus drive control device, which is not illustrated in the drawing, and the movable apparatus drive control device performs automatic driving control such as steering, acceleration, and braking based on the object detection result.

The display unit 113 is a unit for displaying an image acquired from the imaging system, and is used for the driver to visually recognize (view) the surroundings of the vehicle in a case when a driving mode is a manual driving mode, or the like.

Specifically, an image for viewing which is output from the image processing unit 109 is displayed. Note that, as described above, the image processing unit 109 may generate an image for viewing and display the image on the display unit 113 even in an automatic driving mode.

In the present embodiment, the display unit 113 has, for example, a form of an electronic mirror, but it is not limited thereto as long as a driver can visually recognize the image. In addition, an image may be recorded in a recording unit such as a drive recorder, separately from the display unit 113 for the driver to visually recognize an image in real time.

Further, the image processing system 102 may be provided with a communication unit to perform bidirectional communication with the outside of a movable apparatus through a network, for example, to transmit an image and to record the image in a recording unit such as an external server. Note that an image to be recorded in the recording unit is not limited to an image for viewing, and may be an image for sensing or may be an image of which the gradation is compressed before being decompressed by the decompression unit 108.

Figure 5:
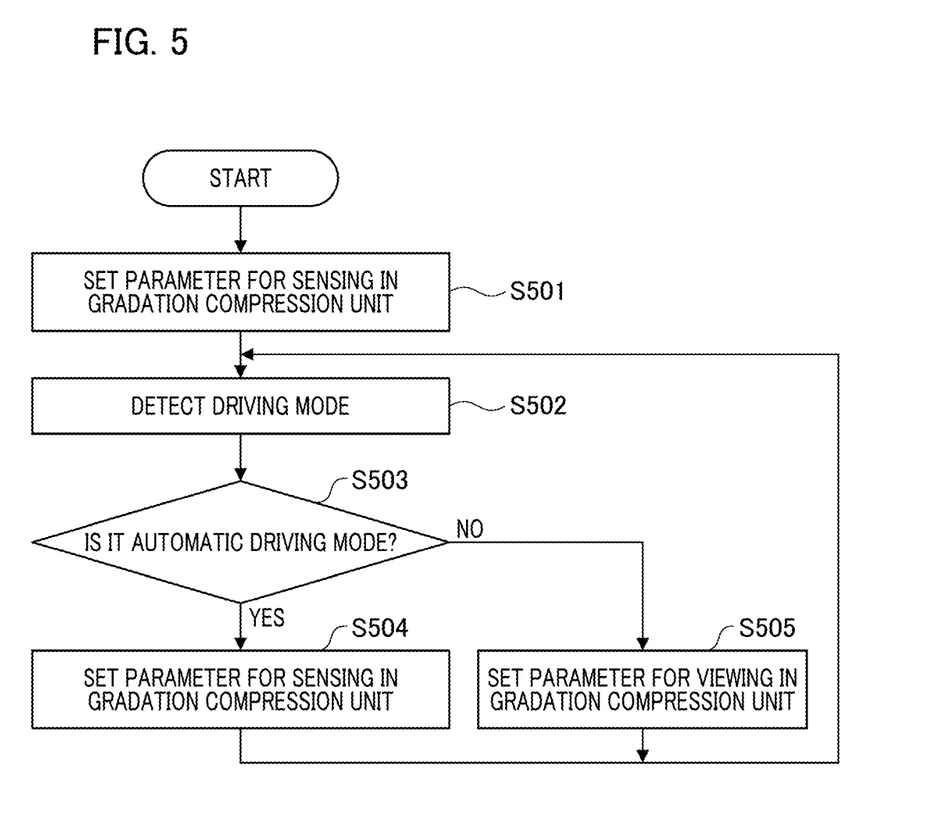
FIG. 5 is a flowchart illustrating an image processing system control flow according to the first embodiment.

FIG. 5 is a flowchart illustrating an image processing system control flow according to the first embodiment, and a control flow of the image processing system in the first embodiment will be described with reference to FIG. 5.

Note that a computer inside the in-vehicle camera system 100 executes a computer program stored in the memory to perform the operation of each step in the flowchart of FIG. 5.

In step S501, the computer of the in-vehicle camera system 100 performs initial setting of input/output conversion parameters on the gradation compression unit 106. Specifically, out of the two input/output conversion parameters stored in the gradation compression unit 106 in advance, the input/output conversion parameter for sensing (FIG. 4C) is selected as an initial setting value.

Note that, in the present embodiment, sensing is prioritized and set as an initial value on the assumption that an environment is suitable for an automatic driving mode. However, when an environment is unsuitable for automatic driving, such as when the number of objects to be recognized is small, the input/output conversion parameter for viewing (FIG. 4B) may be set as an initial value.

In step S502, the image processing system control unit 110 detects which state of an automatic driving mode or a manual driving mode the current driving mode is set to be in by using the driving mode detection unit 111.

In step S503, the image processing system control unit 110 determines whether the driving mode detected in step S502 is an automatic driving mode. In a case where the determination result indicates that the driving mode is an automatic driving mode, the processing proceeds to step S504 to perform system control for sensing. In a case where the determination result indicates that the driving mode is not an automatic driving mode, the processing proceeds to step S505 to perform system control for viewing.

In step S504, an input/output conversion parameter for sensing is set in the gradation compression unit 106. Specifically, the image processing system control unit 110 transmits information indicating that sensing is currently being performed to the imaging system control unit 103.

In addition, the imaging system control unit 103 having received the information performs setting so that the gradation compression unit 106 uses the input/output conversion parameters illustrated in FIG. 4C. After the input/output conversion parameters are set to perform gradation compression, the processing returns to step S502 again.

In step S505, an input/output conversion parameter for viewing is set. Specifically, the image processing system control unit 110 transmits information indicating that the driving mode is not an automatic driving mode to the imaging system control unit 103.

In addition, the imaging system control unit 103 having received the information performs setting so that the gradation compression unit 106 uses the input/output conversion parameter for viewing in FIG. 4B. After the input/output conversion parameter is set to perform gradation compression, the processing returns to step S502 again.

In this manner, in the present embodiment, a gradation compression step of performing gradation compression processing on an image signal based on at least one of two or more input/output conversion parameters is provided.

In addition, as described above, the imaging system control unit 103 executes an imaging system control step of setting input/output conversion parameter in the gradation compression unit 106 according to a driving mode (imaging mode) in the image processing system 102.

Thereby, it is possible to perform optimum gradation compression processing according to the purpose or use of a captured image and to suppress deterioration of image quality for viewing accompanying the gradation compression processing and deterioration of object recognition performance for sensing.

Note that, in the present embodiment, description has been given by using two input/output conversion parameters for sensing and viewing as parameters to be stored in the gradation compression unit 106, but other parameters may also be used in addition to the input/output conversion parameters.

For example, a night vision mode may be provided as an imaging mode (driving mode), and switching to an input/output conversion parameter for a night vision mode may be performed in the night vision mode. That is, for example, a night vision viewing mode for nighttime may be further provided as a driving mode, and an input/output conversion parameter for night vision viewing in which more gradations are allocated to dark parts than in a normal viewing mode may be newly provided.

In addition, a night vision sensing mode for nighttime may be further provided as a driving mode, and a new input/output conversion parameter for night vision sensing in which more gradations are allocated to dark parts than in a normal sensing mode may be provided. As the number of types of input/output conversion parameters increases, more appropriate gradation compression processing can be performed in accordance with the purpose and application.

Further, in a case when three or more input/output conversion parameters are switched, parameters are set in the gradation compression unit 106 in descending order of priority, and the input/output conversion parameters set in the gradation compression unit 106 may be updated while being overwritten when the priority is changed.

For example, two types of normal input/output conversion parameters for sensing and viewing may be stored in the gradation compression unit 106 during the daytime, and input/output conversion parameters for night vision sensing and night vision viewing may be overwritten in the gradation compression unit 106 again for nighttime. By performing such control, it is possible to immediately switch among many types of input/output conversion parameters while suppressing the circuit size of the gradation compression unit 106.

Further, in the present embodiment, a description has been given on the assumption that the input/output conversion parameters in FIGS. 4B and 4C are directly switched. However, some transition parameters may be provided between FIGS. 4B and 4C, and the input/output conversion parameters may be gradually switched via the transition parameters.

Figure 6:
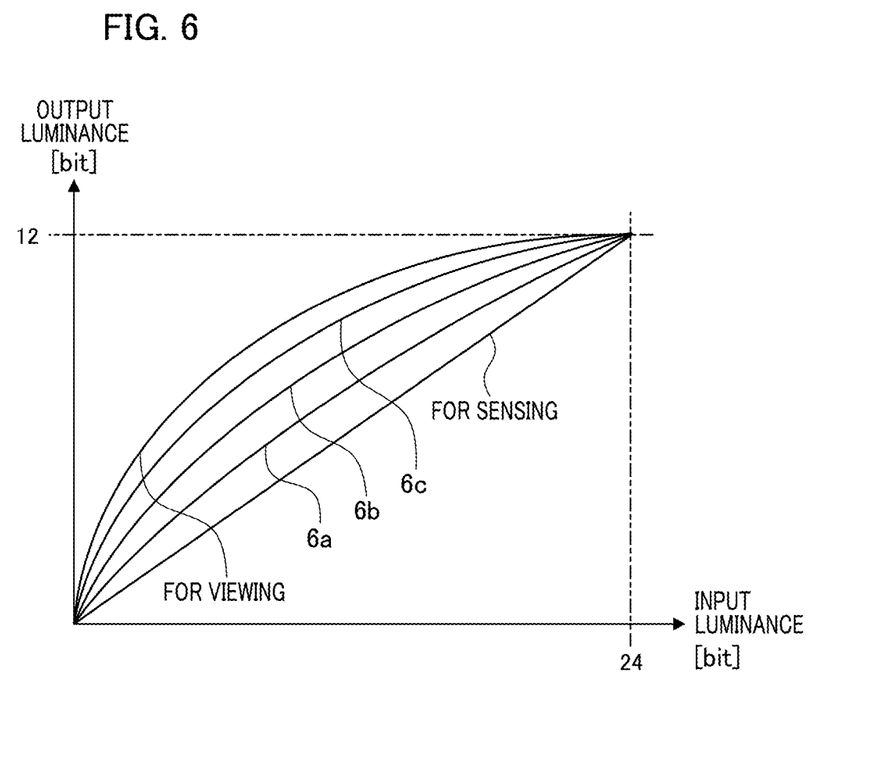
FIG. 6 is a conceptual diagram of a case when transition parameters are used at the time of switching input/output conversion parameters used in the gradation compression unit 106 according to the first embodiment.

FIG. 6 is a conceptual diagram in a case when transition parameters are used at the time of switching input/output conversion parameters used in the gradation compression unit 106 according to the first embodiment.

For example, as illustrated in FIG. 6, three types of transition parameters (6*a*, 6*b*, 6*c*) are provided between the input/output conversion parameters of FIGS. 4B and 4C.

When a parameter for sensing is switched to a parameter for viewing, the parameter for sensing may be gradually changed to the parameter for viewing via the transition parameters 6*a*, 6*b*, and 6*c* with the elapse of time. By performing such control, it is possible to reduce a possibility that abnormal driving (sudden start, sudden braking, sudden turning, or the like) will occur due to a sudden change in gradation performance.

Further, when an input/output conversion parameter is gradually changed, a method of switching the input/output conversion parameter may be changed in accordance with the mental state of a driver, the operation status of a movable apparatus, the speed of the movable apparatus, a luminance distribution (histogram) of an object, and the like.

For example, when a driving mode is switched from a manual driving mode to an automatic driving mode, a driver may be mentally uneasy and may not want to switch the driving mode to an automatic driving mode yet. Such a driver's mental state can be discriminated by AI based on the driver's face image, or the like.

Further, it is also possible to discriminate the driver's mental state from operation history information such as steering being performed regularly even when the frequency is low. When there is such a mental state of the driver, when there is an operation history, or when there is a high risk that a vehicle speed is high and switching to an automatic driving mode is performed, the switching may be delayed for a predetermined time or more.

Further, a curve of an input/output conversion parameter may be changed such that the gradation of a portion with a high frequency of a luminance histogram becomes higher than the gradation of a portion with a low frequency of a luminance histogram, based on a luminance distribution. Further, in a case when the deviation of the frequency is equal to or greater than a predetermined level, switching may be performed to a curve of an input/output conversion parameter for sensing for detecting gradation only in a portion where a frequency is higher than a predetermined value.

In this manner, it is possible to obtain more optimum gradation characteristics by changing a method of switching an input/output conversion parameter in accordance with at least one of the mental state of a driver of a movable apparatus, the operation status of the movable apparatus, the speed of the movable apparatus, and a luminance distribution of an object.

In addition, for example, when a normal sensing mode is switched to a night vision sensing mode, there is also a method of making the switching transition more slowly than usual in a case when a change in the brightness of an object is slow such as at sunset, and accelerating the transition in a case when the brightness of the subject changes suddenly such as at an entrance and an exit of a tunnel. In this manner, it is possible to appropriately control a delay time of switching of input/output conversion parameter in accordance with the driving status and environmental conditions.

Further, a switching response time at the time of switching from a parameter for sensing to a parameter for viewing may be made different from a switching response time at the time of switching from the parameter for viewing to the parameter for sensing.

As described above, by setting appropriate input/output conversion parameters in the gradation compression unit 106 in accordance with an imaging mode such as a driving mode, it is possible to minimize the deterioration of image quality performance for viewing accompanying gradation compression processing and object recognition performance for sensing.

Second Embodiment

A second embodiment of the present invention will be described below. In the first embodiment, only one image transmission path is provided from the gradation compression unit to the image processing unit, whereas two image transmission paths are provided in the second embodiment.

The purpose is to perform optimum gradation compression processing for each of an image for viewing and an image for sensing and to output them simultaneously in a case when viewing and sensing are described to be performed simultaneously.

In the present embodiment, the two paths are assumed to be a path A and a path B, and a configuration is adopted in which the path A is preferentially used when two images are not output simultaneously, and the path B is used in addition to the path A when two images are output simultaneously. However, the present invention is not limited to the above-described method, and other methods may be used as long as switching between one-image output and two-image output can be performed.

Figure 7:
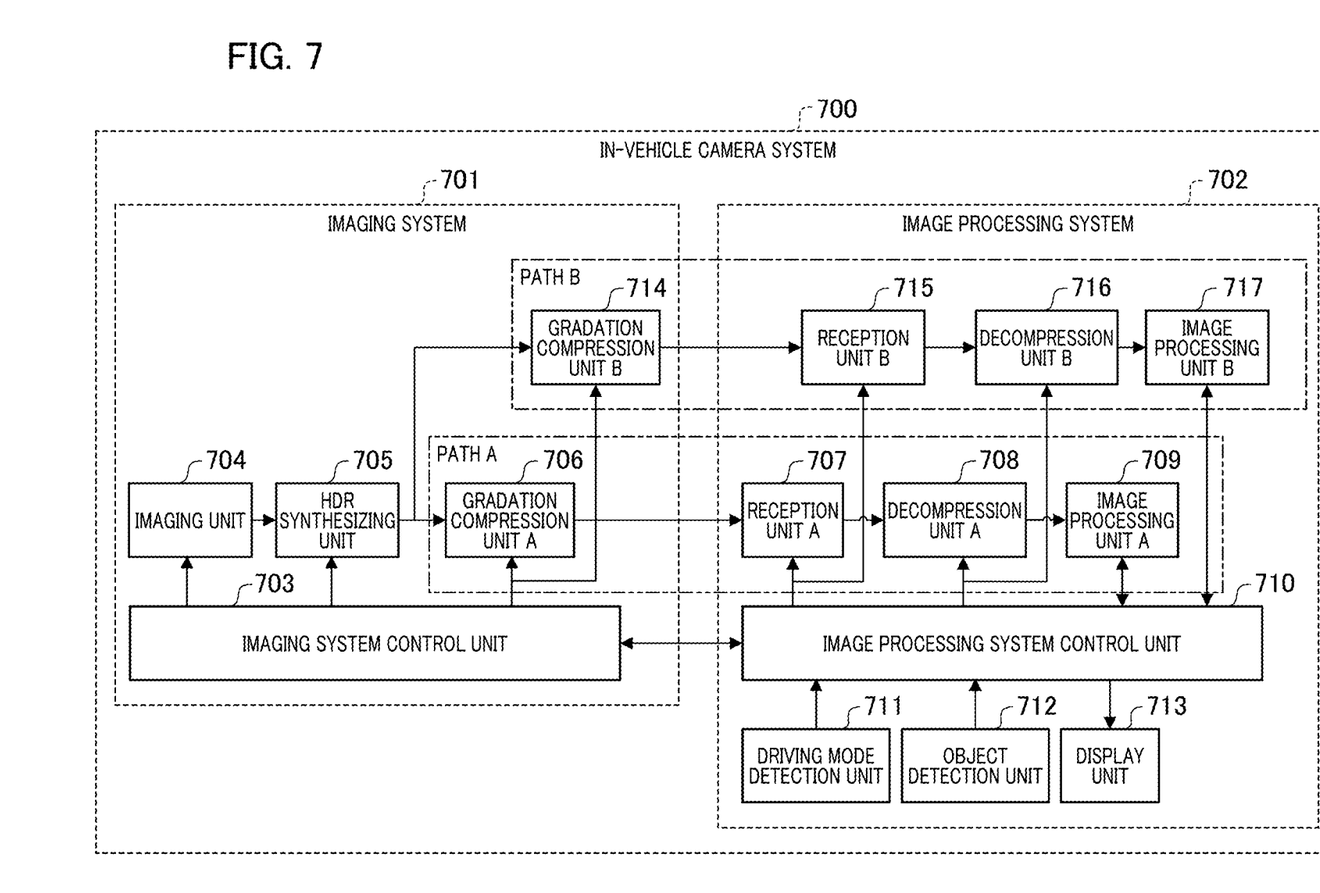
FIG. 7 is a functional block diagram of an in-vehicle camera system 700 in a second embodiment.

FIG. 7 is a functional block diagram of an in-vehicle camera system 700 in the second embodiment. Configurations of 700 to 713 in FIG. 7 in the present embodiment correspond to the configurations of 100 to 113 in FIG. 1, and they have the same functions.

However, for a gradation compression unit A706, a reception unit A707, a decompression unit A708, and an image processing unit A709, the name of each unit is followed by A indicating the path A in order to distinguish between the path A and the path B.

Hereafter, the same contents as those in FIG. 1 will be omitted, and only differences from the present embodiment will be described.

Note that some of the functional blocks illustrated in FIG. 7 are implemented by causing a computer, not illustrated in the drawing, which is included in an in-vehicle camera system 700 to execute a computer program stored in a memory, not illustrated in the drawing, as a storage medium. However, some or all of them may be implemented by hardware. As the hardware, a dedicated circuit (ASIC), a processor (reconfigurable processor, DSP), or the like, can be used.

Note that functional blocks in an imaging system 701 do not need to be built in the same housing, and may be configured as separate devices connected to each other via signal paths. Similarly, functional blocks in an image processing system 702 may not be built in the same housing, and may be constituted by separate devices connected to each other via signal paths.

In the second embodiment, a gradation compression unit B714, a reception unit B715, a decompression unit B716, and an image processing unit B717 are provided in addition to the configuration of the first embodiment. In addition, the functions thereof are equivalent to those of the gradation compression unit A706 (106), the reception unit A707 (107), the decompression unit A708 (108), and the image processing unit A709 (109).

In the present embodiment, a configuration is adopted in which an image for sensing is preferentially used, and an image for viewing is also used as needed. That is, an input/output conversion parameter for sensing (FIG. 4C) is stored in the gradation compression unit A706 (first gradation compression unit) in advance, and an input/output conversion parameter for viewing (FIG. 4B) is stored in the gradation compression unit B714 (second gradation compression unit) in advance.

In a case when an image for viewing is described to be used preferentially, a parameter for viewing and a parameter for sensing may be reversed, or the priority of the path A and the priority of the path B may be switched without changing the parameters.

Similar to the reception unit A707, the reception unit B715 performs processing for receiving an image signal output from the gradation compression unit B714. A decompression parameter for sensing is set in the decompression unit A708, and a decompression parameter for viewing is set in the decompression unit B716.

The image processing unit A709 performs image processing suitable for the image processing system 102 to perform sensing. Further, image emphasis processing, and the like, are performed in advance before the object detection unit 712 detects an object.

The image processing unit B717 performs image processing so that image quality suitable for a driver to perform viewing is obtained. After various types of image processing are performed, processing for displaying an image on a display unit 713 for the driver to visually recognize the image is also performed.

Figure 8:
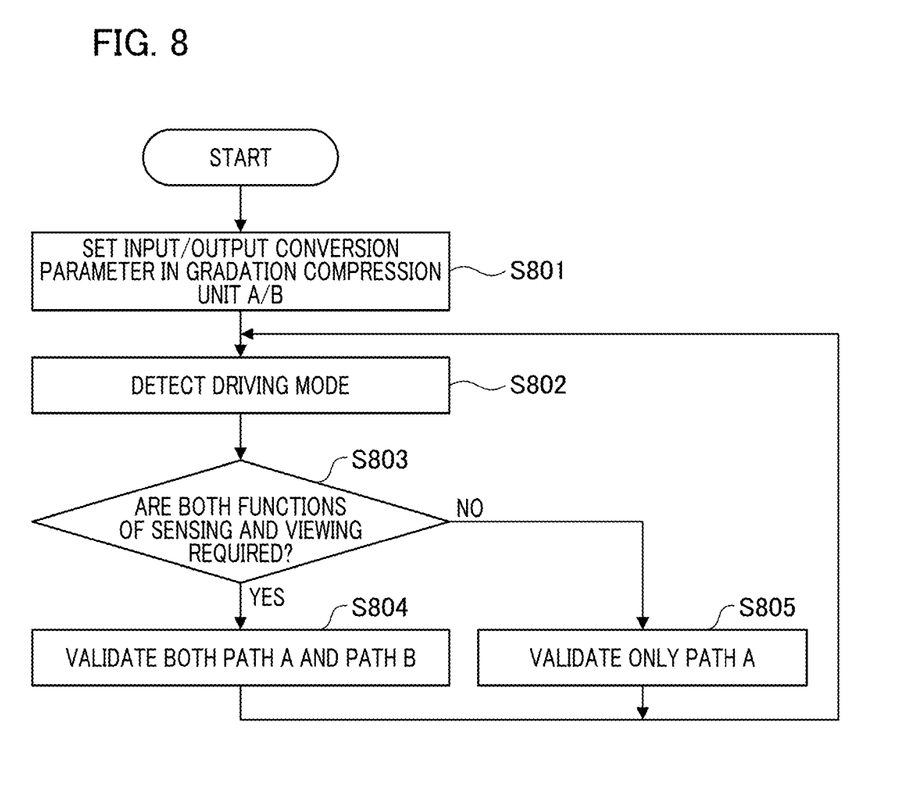
FIG. 8 is a flowchart illustrating an image processing system control flow according to the second embodiment.

FIG. 8 is a flowchart illustrating an image processing system control flow according to the second embodiment, and the image processing system control flow in the second embodiment will be described with reference to FIG. 8.

Note that a computer inside the in-vehicle camera system 700 executes a computer program stored in the memory to perform the operation of each step in the flowchart of FIG. 8.

In step S801, the computer inside the in-vehicle camera system 700 performs initial setting of input/output conversion parameters on the gradation compression unit A706 and the gradation compression unit B714 (second gradation compression unit).

Specifically, an input/output conversion parameter for sensing (FIG. 4C), which is stored in the gradation compression unit A706 in advance is set as an initial value. In addition, an input/output conversion parameter for viewing (FIG. 4B), which is stored in the gradation compression unit B714 in advance, is set as an initial value in the gradation compression unit B714.

Step S802 is the same as step S502 according to the first embodiment, and thus the description thereof is omitted.

In step S803, the image processing system control unit 710 determines whether both sensing and viewing functions are necessary based on a determination result for a driving mode. In a case when it is determined that a driving mode that requires both the functions is set, the image processing system control unit 710 transmits the information to the imaging system control unit 703.

In this case, in step S804, the imaging system control unit 703 having received the information, validates both the path A and the path B, and an HDR synthesizing unit 705 outputs a synthesized image to both the gradation compression unit A706 and the gradation compression unit B714.

In a case when the image processing system control unit 710 determines in step S803 that a driving mode that does not require both the sensing and viewing functions is set, only the path A is validated in step S805.

In addition, the imaging system control unit 703 outputs the synthesized image from the HDR synthesizing unit 705 to only the gradation compression unit A706. After steps S804 and S805 are executed, the processing returns to step S802 again.

As described above, in the case of a driving mode that requires both an image for sensing and an image for viewing, an image having been subjected to gradation compression processing suitable for sensing and an image having been subjected to gradation compression processing suitable for viewing are generated simultaneously by using two different gradation compression units.

Thereby, it is possible to simultaneously output the image for viewing and the image for sensing while minimizing the deterioration in performance accompanying the gradation compression processing.

Note that, an example in which a camera system is mounted on a movable apparatus, such as an automobile, has been described in the above-described embodiment. However, the movable apparatus in the present embodiment is not limited to a vehicle such as an automobile and may be any mobile device such as a train, a ship, an airplane, a robot, and a drone.

In addition, the present embodiment can also be applied when a movable apparatus is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the camera system through a network or various storage media. Then, a computer (or a CPU, an MPU, or the like) of the camera system may be configured to read and to execute the program. In such a case, the program and the storage medium storing the program configure the present invention.

What is claimed is:

1. A camera system comprising:
at least one processor or circuit configured to function as:
an imaging system that includes:
an imaging unit configured to image an object to generate an image signal;
a gradation compression unit configured to perform gradation compression processing on the image signal based on at least one of two or more input/output conversion parameters; and
an imaging system control unit configured to set the at least one input/output conversion parameter in the gradation compression unit; and
an image processing system that acquires an image from the imaging system in at least one of two or more imaging modes, wherein the two or more imaging modes include an automatic driving mode and a manual driving mode,
wherein the imaging system control unit sets the at least one input/output conversion parameter in the gradation compression unit according to the at least one imaging mode acquired in the image processing system,
wherein the two or more input/output conversion parameters include at least a parameter for viewing suitable for visually recognizing an image and a parameter for sensing suitable for performing image recognition, and
wherein the imaging system control unit sets the parameter for sensing in a case when the automatic driving mode is selected and sets the parameter for viewing in a case when the manual driving mode is selected.

2. The camera system according to claim 1, wherein the parameter for viewing has more gradations for a luminance signal that is equal to or less than a predetermined input luminance value than the parameter for sensing.

3. The camera system according to claim 1, wherein the imaging system control unit switches the input/output conversion parameter via a parameter for transition.

4. The camera system according to claim 1, wherein the imaging system control unit changes a method of switching the input/output conversion parameters in accordance with at least one of a mental state of a driver of a movable apparatus, an operation status of the movable apparatus, a speed of the movable apparatus, and a luminance distribution of an object.

5. The camera system according to claim 1, wherein the image processing system further has a night vision mode, and the image processing system performs switching to an input/output conversion parameter suitable for the night vision mode when the night vision mode is selected.

6. The camera system according to claim 1, wherein the gradation compression unit includes a first gradation compression unit that performs gradation compression processing using the parameter for sensing, and a second gradation compression unit that performs gradation compression processing using the parameter for viewing.

7. The camera system according to claim 1, wherein the imaging unit outputs the image signal obtained by synthesizing images obtained by imaging an object with different exposure periods or different sensitivities.

8. A movable apparatus comprising:
at least one processor or circuit configured to function as:
an imaging system that includes:
an imaging unit configured to image an object to generate an image signal;
a gradation compression unit configured to perform gradation compression processing on the image signal based on at least one of two or more input/output conversion parameters; and
an imaging system control unit configured to set the at least one input/output conversion parameter in the gradation compression unit;
an image processing system that acquires an image from the imaging system in at least one of two or more imaging modes, wherein the two or more imaging modes include an automatic driving mode and a manual driving mode; and
a display unit configured to display an image acquired from the imaging system,
wherein the imaging system control unit sets the at least one input/output conversion parameter in the gradation compression unit according to the at least one imaging mode acquired in the image processing system,
wherein the two or more input/output conversion parameters include at least a parameter for viewing suitable for visually recognizing an image and a parameter for sensing suitable for performing image recognition, and
wherein the imaging system control unit sets the parameter for sensing in a case when the automatic driving mode is selected and sets the parameter for viewing in a case when the manual driving mode is selected.

9. A camera system control method comprising:
imaging an object to generate an image signal;
performing gradation compression processing on the image signal based on at least one of two or more input/output conversion parameters;
setting the at least one input/output conversion parameter in the performing of the gradation compression processing; and
acquiring an image in at least one of two or more imaging modes, wherein the two or more imaging modes include an automatic driving mode and a manual driving mode,
wherein the at least one input/output conversion parameter is set according to the at least one imaging mode acquired in the acquiring of the image,
wherein the two or more input/output conversion parameters include at least a parameter for viewing suitable for visually recognizing an image and a parameter for sensing suitable for performing image recognition, and
wherein the setting sets the parameter for sensing in a case when the automatic driving mode is selected and sets the parameter for viewing in a case when the manual driving mode is selected.

10. A non-transitory computer-readable storage medium configured to store a computer program comprising instructions for executing the following processes:
imaging an object to generate an image signal;
performing gradation compression processing on the image signal based on at least one of two or more input/output conversion parameters;
setting the at least one input/output conversion parameter in the performing of the gradation compression processing; and
acquiring an image in at least one of two or more imaging modes, wherein the two or more imaging modes include an automatic driving mode and a manual driving mode,
wherein the at least one input/output conversion parameter is set according to the at least one imaging mode acquired in the acquiring of the image,
wherein the two or more input/output conversion parameters include at least a parameter for viewing suitable for visually recognizing an image and a parameter for sensing suitable for performing image recognition, and
wherein the setting sets the parameter for sensing in a case when the automatic driving mode is selected and sets the parameter for viewing in a case when the manual driving mode is selected.

11. The movable apparatus according to claim 8, wherein the parameter for viewing has more gradations for a luminance signal that is equal to or less than a predetermined input luminance value than the parameter for sensing.

12. The movable apparatus according to claim 8, wherein the imaging system control unit switches the input/output conversion parameter via a parameter for transition.

13. The movable apparatus according to claim 8, wherein the imaging system control unit changes a method of switching the input/output conversion parameters in accordance with at least one of a mental state of a driver of a movable apparatus, an operation status of the movable apparatus, a speed of the movable apparatus, and a luminance distribution of an object.

14. The movable apparatus according to claim 8, wherein the image processing system further has a night vision mode, and the image processing system performs switching to an input/output conversion parameter suitable for the night vision mode when the night vision mode is selected.

15. The movable apparatus according to claim 8, wherein the gradation compression unit includes a first gradation compression unit that performs gradation compression processing using the parameter for sensing, and a second gradation compression unit that performs gradation compression processing using the parameter for viewing.

16. The movable apparatus according to claim 8, wherein the imaging unit outputs the image signal obtained by synthesizing images obtained by imaging an object with different exposure periods or different sensitivities.

* * * * *